United States Patent [19]

Kieser

[11] Patent Number: 4,986,853

[45] Date of Patent: Jan. 22, 1991

[54] PEARLESCENT PIGMENT PREPARATIONS

[75] Inventor: Manfred Kieser, Darmstadt, Fed. Rep. of Germany

[73] Assignee: Merck Patent Gesellschaft Mit Beschrankter Haftung, Darmstadt, Fed. Rep. of Germany

[21] Appl. No.: 179,830

[22] Filed: Apr. 11, 1988

[30] Foreign Application Priority Data

Apr. 10, 1987 [DE] Fed. Rep. of Germany ....... 3712289

[51] Int. Cl.$^5$ .......................... C09C 3/08; C08K 5/09
[52] U.S. Cl. ................................. 106/504; 106/505; 106/415; 106/417
[58] Field of Search .................... 106/308 F, 291, 504, 106/505, 415, 417; 428/407

[56] References Cited

U.S. PATENT DOCUMENTS

| | | | |
|---|---|---|---|
| 3,775,360 | 11/1973 | Smith | 106/504 |
| 4,116,628 | 9/1978 | Hesse et al. | 427/154 |
| 4,390,524 | 6/1983 | Nasuno et al. | 106/504 |
| 4,490,179 | 12/1984 | Bernhard | 106/308 F |
| 4,648,908 | 3/1987 | Takasuka | 106/308 F |

FOREIGN PATENT DOCUMENTS 1357319 6/1974 United Kingdom.

*Primary Examiner*—Paul Lieberman
*Assistant Examiner*—Christine A. Skane
*Attorney, Agent, or Firm*—Millen, White & Zelano

[57] ABSTRACT

The invention relates to lamina-shaped pearlescent pigment preparations of improved flowability, wherein the starting pigments have been coated with preferably 0.2–20% by weight of a saturated monocarboxylic acid having 10°–25° C. atoms or of a cyclohexanone condensate resin.

16 Claims, No Drawings

PEARLESCENT PIGMENT PREPARATIONS

The invention relates particularly to lamina-shaped (laminar) pearlescent pigment preparations of improved flowability.

BACKGROUND OF THE INVENTION

The improvement o the flowability or flow behavior of pulverulent substances of all kinds has been the subject of many investigations and endeavors. Since the flow behavior is determined by the individual physical properties of the powders, such as, for example, the hygroscopicity, the shape and the particle size distribution of the powder particles, the capacity for accepting electrostatic charge and the adhesion of the particles to one another, very individual solutions have often been suggested for particular problems.

The addition of pyrogenic silica, that is to say a finely divided silica having a particle size of about 10 nm, is a customary and widely applicable agent for improving the flowability of powders. The attempt to improve the flowability of lamina-shaped pearlescent pigments by adding this auxiliary has, however, been unsuccessful. Lamina-shaped pearlescent pigments are, however, employed in the form of dry powder in numerous applications, and the pronounced tendency of these pigments to form agglomerates results in considerable problems in this regard. Thus, DE-A1-3,321,953, for example, suggests a modification, expensive in terms of apparatus, of bronzing machines in order to enable pearlescent pigments also to be employed in bronzing processes.

SUMMARY OF THE INVENTION

It is therefore an object of the invention to provide pulverulent pearlescent pigments modified in such a way that they exhibit an improved flowability and hence no longer tend to clog up and form agglomerates in funnels and on rolls and similar equipment.

Upon further study of the specification and appended claims, further objects and advantages of this invention will become apparent to those skilled in the art.

These objects have been achieved by means of the present invention. This is because it has been found that a drastic improvement in the flow behavior or the flowability is achieved by coating the pigments with monocarboxylic acids or cyclohexanone condensate resins.

The invention therefore relates to pulverulent pearlescent pigment preparations of improved flowability, which are characterized in that the pigments have been coated with a saturated monocarboxylic acid or a cyclohexanone condensate resin. Preferably, 0.2-20% by weight of acid or resin is used. Preferably, the acid has 10-26 carbon atoms.

The invention also relates to a process for the preparation of pulverulent pearlescent pigment preparations of improved flowability, which is characterized in that a lamina-shaped pigment is wetted with a melt of a saturated monocarboxylic acid preferably having 10-26 C atoms, or of a cyclohexanone condensate resin, or with a solution of these substances in an organic solvent, and is dried by evaporating off the solvent or by cooling.

DETAILED DISCUSSION

The starting material used for the pearlescent pigment preparations coated in accordance with the invention can be any customary pearlescent pigments, such as, for example, bismuth oxychloride, mica coated with bismuth oxychloride, or lamina-shaped metal oxides, in particular lamina-shaped iron oxides. However, pearlescent pigments based on mica flakes coated with metal oxides, especially titanium dioxide and/or iron oxide, are employed particularly preferably. All these pigments are known and can either be prepared by known methods or are commercially available, for example under the trademark Iriodin of E. Merck, Darmstadt. A description of these pigments and of some processes for their preparation is to be found, for example, in German Patent Specification Nos. 1,467,468, 1,959,998, 2,009,566, 2,214,545 and 2,522,572, in European Patent Specification Nos. 14,382 and 68,311 and in U.S. Pat. No. 4,373,963.

Saturated monocarboxylic acids having a chain length of 10-26 C atoms or cyclohexanone condensate resins are employed for coating these pigments. An amount of about 0.2-20% by weight, relative to the weight of pigment, has proved advantageous, amounts of about 0.5-10% and particularly about 1-5% being particularly preferred. The carboxylic acids employed are most preferably those having 12 to 18 C atoms. As well as, or instead of, the free acid, it is also possible to employ salts, the alkali metal and ammonium salts being particularly preferred.

The term cyclohexanone condensate resins is to be understood as meaning polymers based on cyclohexanone which, generally, have a softening range from about 65° to about 95° C., preferably from about 75° to about 85° C.

The coating agents can be employed either in the form of a melt or in the form of a solution. The solvents used in this regard are preferably readily volatile organic solvents which can readily be removed by evaporation after the pigment surface has been wetted. In particular, solvents having a boiling range from about 40° to about 80° C., such as, for example, methylene chloride, methanol, acetone, ethylacetate or ethanol, are employed.

The coating itself is effected by simple mixing of the components. Thus, for example, the pigment can be initially taken in a drum mixer, conical mixer or tumble mixer and are mixed with the melt or solution of the coating agent. If the coating agent is employed in the form of a solution, it is also possible to disperse the pigment in this solution and to remove the solvent by evaporation or distillation. The spray drying of a suspension of this type is also suitable. After the solvent has been removed or after the coating agent applied as a melt has been cooled, the pigment preparation is in the form of a free-flowing powder which can be processed easily. The improvement in the flowability can be determined very simply by measuring the height of a poured cone. This is effected by sprinkling the pigment powder through a metal sieve onto a massive metal cylinder, in the course of which a poured cone is built up on the metal cylinder. The poorer the flow properties of the powder, the steeper is the slope of this cone and the higher and more pointed the poured cone. When the pigment preparations according to the invention are measured, it is found that the height of the poured cone is markedly reduced compared with the untreated pigments.

The greatly reduced tendency to form agglomerates, which can otherwise be observed, particularly in the case of finely divided pigments, also manifests itself in increased generation of dust by the pigment preparations. This can, however, be prevented by moistening the preparations with a sparingly volatile organic solvent, in particular a plasticizer customarily employed in the plastics industry. For applications in which increased generation of dust would cause problems, the pigment preparations are therefore additionally moistened with about 0.5-7% by weight, in particular about 1-4% by weight, of such an agent.

Examples of suitable solvents of this type are phthalic acid esters with linear, branched or also cyclic alcohols having up to 12 C atoms, such as, for example, dioctyl phthalate (di-2-ethylhexyl phthalate), diisononyl phthalate, diisodecyl phthalate, dibutyl phthalate, diisobutyl phthalate and dicyclohexyl phthalate, aliphatic dicarboxylic acid esters, such as, for example, esters of adipic, sebacic or azelaic acid, fatty acid esters, citric acid esters and other plasticizers such as are mentioned, for example, in Kirk-Othmer, volume 15, pages 720-789. It is preferable to use phthalic acid esters, particularly dioctyl phthalate. It is also possible to employ mixtures of different plasticizers in various proportions as may be determined to be effective by one of ordinary skill in the art under routine testing.

These solvents can be applied, analogously to the coating agents, by simply mixing or spraying. This can be carried out together with the coating agent or after coating.

The pearlescent pigment preparations thus obtained can be employed for any customary purposes, but especially in cases where processing depends on good flowability.

Without further elaboration, it is believed that one skilled in the art can, using the preceding description; utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire text of all applications, patents and publications, if any, cited above and below are hereby incorporated by reference.

EXAMPLES

EXAMPLE 1

50 g of a mica pigment coated with titanium dioxide and having a particle size distribution of 10-60 μm are stirred into a solution of 1 g of stearic acid in 100 ml of methylene chloride, and the solvent is removed. This gives a free-flowing pigment preparation which generates a great deal of dust.

EXAMPLE 2

The procedure is as in Example 1, but a solution of 2.5 g of stearic acid in 100 ml of methylene chloride is employed.

EXAMPLE 3

The procedure is as in Example 1 but a solution of 1 g of myristic acid in 100 ml of methylene chloride is employed.

EXAMPLE 4

The procedure is as in Example 1 but 1 g of a ketone resin (Carbigen K 90) in 100 ml of methylene chloride is employed.

EXAMPLE 5

The procedure is as in Example 3, but 1 g of dibutyl phthalate is also added to the methylene chloride solution. This gives a free-flowing pearlescent pigment preparation which generates little dust.

EXAMPLE 6

The dry pearlescent pigment preparation obtained in accordance with Example 3 is moistened with 1 g of dibutyl phthalate with vigorous stirring. This gives a free-flowing pearlescent pigment preparation which generates little dust.

EXAMPLE 7

50 g of the pearlescent pigment employed in Example 1 are heated to about 80° C., with stirring, and are mixed with 0.75 g of myristic acid at 80° C. Cooling to room temperatures gives a free-flowing pearlescent pigment preparation which generates a great deal of dust.

EXAMPLE 8

The procedure is analogous to that of Example 1, but a mica pigment coated with titanium dioxide and having a particle size distribution of 5-25 μm is employed.

EXAMPLE 9

50 g of a mica pigment coated with $Fe_2O_3$ and having a particle size distribution of 10-60 μm are stirred into a solution of 1 g of lauric acid in 100 ml of methylene chloride, and the solvent is removed. This gives a free-flowing pigment preparation which generates a great deal of dust.

EXAMPLE 10

The procedure is analogous to that of Example 9, but a mixture of 0.5 g of myristic acid and 0.5 g of lauric acid is employed instead of lauric acid.

EXAMPLE 11

100 g of a lamina-shaped iron oxide prepared by the process of U.S. Pat. No. 4,373,963 are coated with 2 g of lauric acid analogously to Example 1.

EXAMPLE 12

10 kg of a mica pigment coated with iron oxide and titanium oxide are heated to 80° C. in a paddle mixer, 200 g of molten myristic acid are added and mixing is carried out for about 30 minutes. This gives a free-flowing pearlescent pigment preparation which generates a great deal of dust.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. Pulverulent pearlescent pigment particles having improved flowability, comprising a pearlescent pigment coated with 1-5% of a saturated $C_{10-26}$-monocarboxylic acid in the free acid form or as an alkali or ammonium salt effective to improve flowability.

2. A pigment according to claim 1, further comprising 0.5-7% by weight, relative to the weight of pigment, of an organic solvent plasticizer.

3. A pigment according to claim 1, wherein the pearlescent pigment is laminar.

4. A pigment according to claim 1, wherein the pearlescent pigment is bismuth oxychloride, mica-coated with bismuth oxychloride or a laminar iron oxide.

5. A pigment according to claim 1, wherein the pearlescent pigment is a mica flake coated with titanium dioxide, iron oxide, or a mixture thereof.

6. A pigment according to claim 1, wherein the monocarboxylic acid is a $C_{12-18}$-monocarboxylic acid.

7. A pigment according to claim 1, moistened with a sparingly volatile organic solvent in an amount effective to reduce the generation of dust.

8. A pigment according to claim 7, wherein the amount of the solvent is about 0.5 to 7% by weight.

9. A pigment according to claim 7, wherein the amount of the solvent is about 1 to 4% by weight.

10. A pigment according to claim 7, wherein the solvent is a $C_{1-12}$-linear or branched or a $C_{3-12}$-cyclic alcohol.

11. A pigment according to claim 7, wherein the solvent is dioctyl phthalate, diisononyl phthalate, diisodecyl phthalate, dibutyl phthalate, diisobutylphthalate, dicyclohexyl phthalate, or a mixture thereof.

12. A pigment according to claim 1, wherein said pigment which is coated with a saturated $C_{10-26}$-monocarboxylic acid is mica coated with titanium or iron oxide.

13. A method for improving the flow characteristics of a pearlescent pigment, comprising coating said pigment with an effective amount of a monocarboxylic acid.

14. A method according to claim 13, wherein the carboxylic acid is a $C_{10-15}$ carboxylic acid.

15. A method according to claim 13, wherein the carboxylic acid is used in an amount of 0.2-20% by weight.

16. A method according to claim 13, wherein the carboxylic acid is used in an amount of 1-5% by weight.

* * * * *